United States Patent [19]

Morrison

[11] 4,135,546

[45] Jan. 23, 1979

[54] STEM PACKING ASSEMBLY FOR GATE VALVES AND MEANS FOR REMOVAL

[75] Inventor: Bertram L. Morrison, Houston, Tex.

[73] Assignee: ACF Industries, Incorporated, New York, N.Y.

[21] Appl. No.: 789,180

[22] Filed: Apr. 20, 1977

[51] Int. Cl.² ............................................. F16K 43/00
[52] U.S. Cl. .................................. 137/315; 251/63.6; 251/214; 277/124
[58] Field of Search .............. 137/315; 251/63.5, 63.6, 251/214, 327, 330; 277/50, 102, 122, 124, 125

[56] References Cited

U.S. PATENT DOCUMENTS

| 2,274,688 | 3/1942 | Griepenstroh | 277/102 |
| 2,668,034 | 2/1954 | Konwal | 251/330 |
| 2,780,233 | 2/1957 | Volpin | 251/330 |
| 3,064,674 | 11/1962 | Carfagna | 251/214 |
| 3,096,070 | 7/1963 | Wolfensperger | 251/214 |
| 3,188,049 | 6/1965 | Zawacki et al. | 251/327 |
| 3,458,172 | 7/1969 | Burrows | 137/315 |
| 3,770,247 | 11/1973 | Nelson | 251/214 |
| 3,789,875 | 2/1974 | McGee | 251/63.6 |
| 3,958,592 | 5/1976 | Wells et al. | 137/315 |
| 3,993,284 | 11/1976 | Lukens, Jr. | 251/63.6 |

FOREIGN PATENT DOCUMENTS

184,417   1/1956   Austria ..................................... 251/214

Primary Examiner—Martin P. Schwadron
Assistant Examiner—G. L. Walton
Attorney, Agent, or Firm—Eugene N. Riddle

[57] ABSTRACT

A packing assembly is arranged between a gate valve stem connected to an actuator and a bonnet secured to the valve body. An externally threaded packing sleeve is threaded within the bonnet and has the packing assembly removably connected thereto for movement with the sleeve. The packing sleeve has an outer end portion which extends into an easily disassembled actuator body where it is easily accessible to a removal tool for replacing the packing. The valve stem has a beveled shoulder thereon which engages a flexible inner flange on the bonnet in the closed position of the gate valve to provide a tight metal-to-metal surface contact between the shoulder and flange.

8 Claims, 7 Drawing Figures

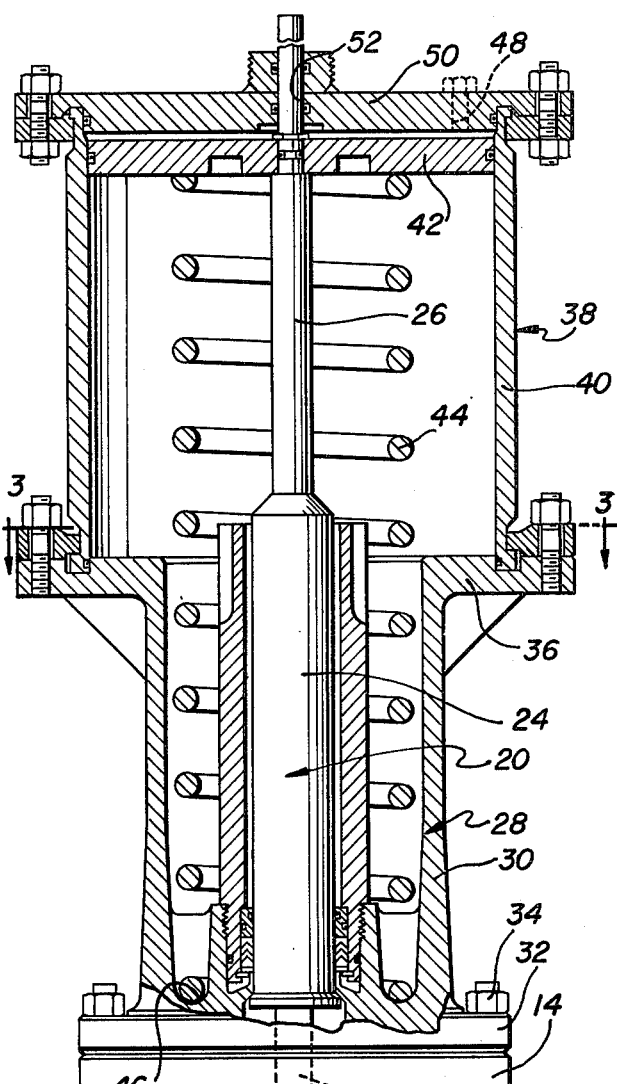
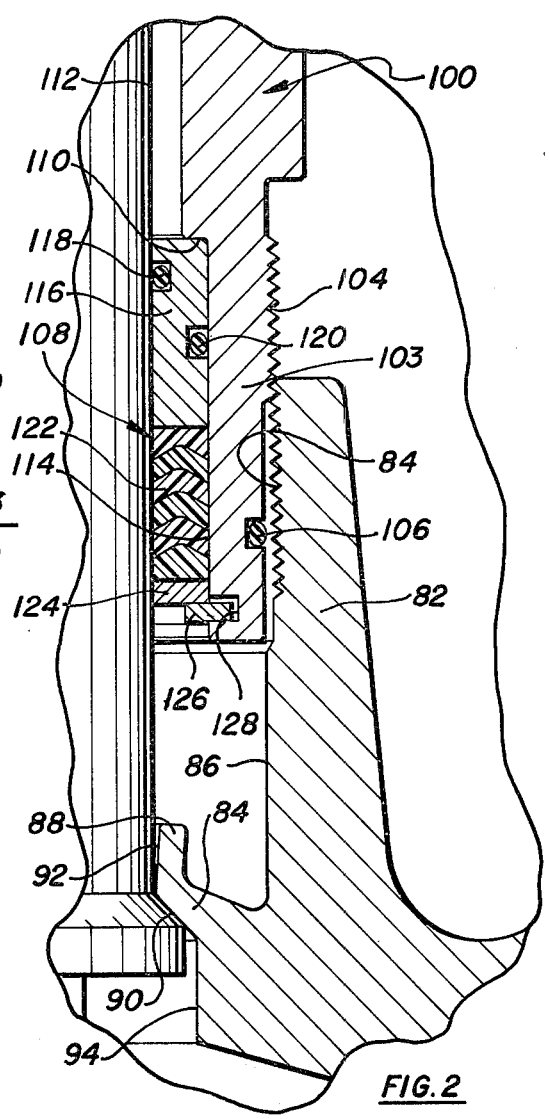
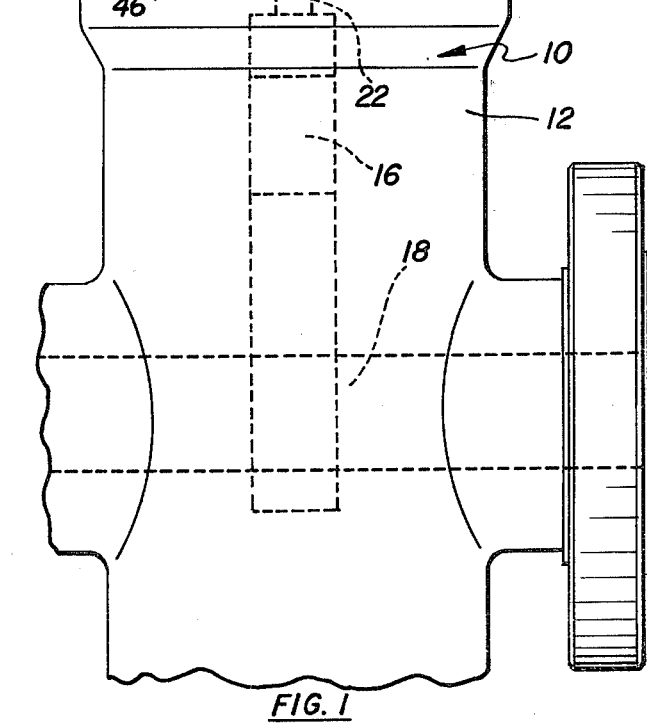
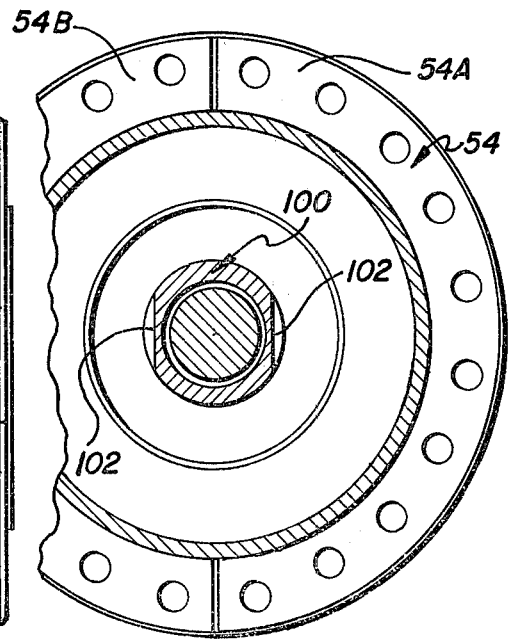
FIG. 1
FIG. 2
FIG. 3

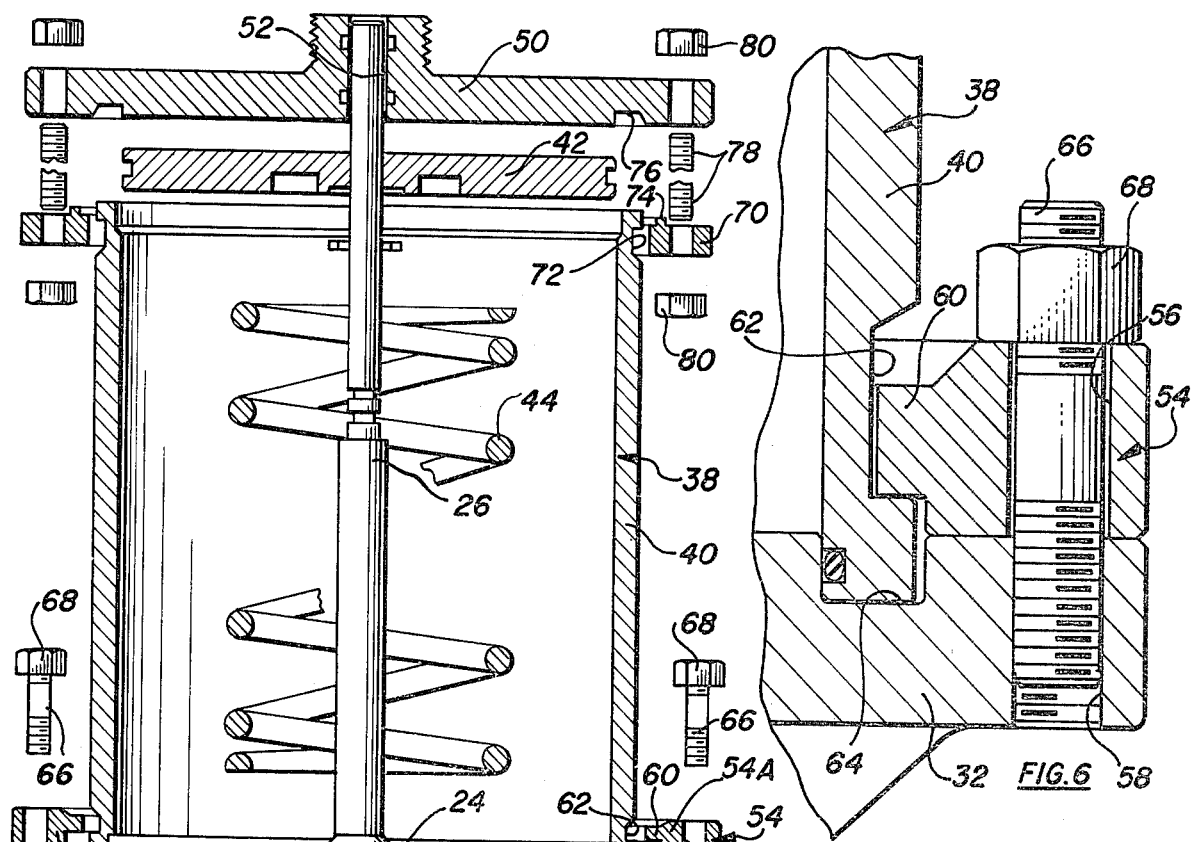
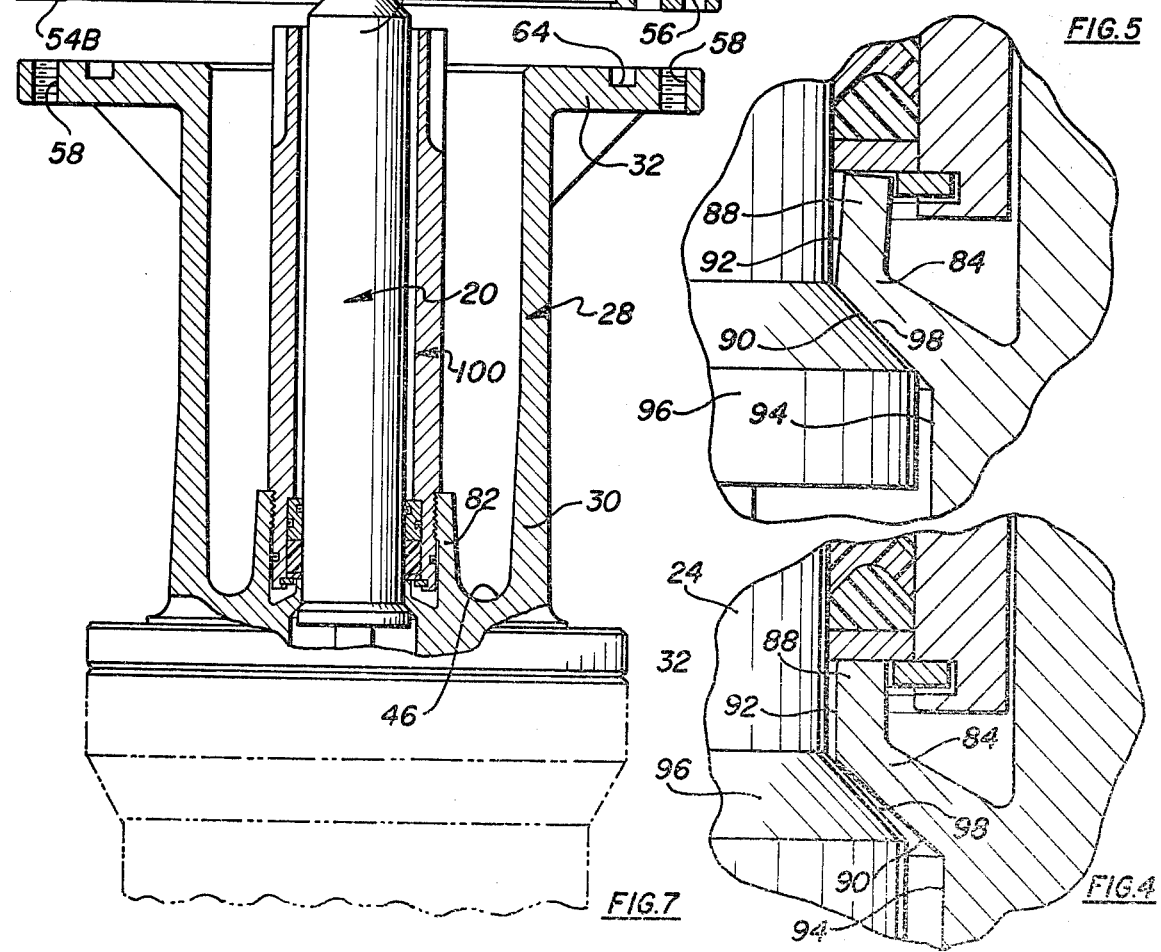

STEM PACKING ASSEMBLY FOR GATE VALVES AND MEANS FOR REMOVAL

BACKGROUND OF THE INVENTION

This invention relates generally to fluid actuators for valves and to packing assemblies for a gate valve stem connected to the actuator.

Heretofore, packing assemblies have been provided for gate valve stems connected to actuators for movement of a gate valve between open and closed positions. However, from time to time, packing assemblies for several various reasons have to be replaced and it is difficult and time consuming to replace such packing. A fluid cylinder for the actuator is normally secured to the valve bonnet and a nut receives the stem and holds the packing in a compressed condition. To replace the packing, it is necessary that the fluid cylinder of the actuator be removed first, then the nut is unthreaded to permit access to the separate packing which is then individually removed and replaced. Representative prior art devices are illustrated in U.S. Pat. No. 3,958,592 dated May 25, 1976 and U.S. Pat. No. 3,993,284 dated Nov. 23, 1976.

DESCRIPTION OF THE PRESENT INVENTION

The preset invention is directed to a gate valve and fluid actuator combination in which the actuator body is mounted on the bonnet of the gate valve body and receives a gate valve stem therein with a piston connected to the stem to move the gate valve between open and closed positions. The improved device includes a packing sleeve or extended nut receiving the stem and threaded within the bonnet. The inner end of the packing sleeve carries a packing assembly in contact with the stem. The packing assembly has one end positioned adjacent an inner annular abutment of the packing sleeve, and a removable ring is positioned adjacent the other end to retain the assembly in place. The outer or upper end of the packing sleeve extends within the cylindrical actuator body and has an upper end portion thereof adapted to have a removal tool fitted thereon. The fluid actuator is arranged to be easily removed.

For replacing the packing, all that is necessary is that the actuator cylinder be removed through a bolted connection and then an upper portion of the packing sleeve or nut is exposed to permit a tool to unthread the packing sleeve. Upon unthreading of the packing sleeve, the packing assembly is withdrawn with the packing sleeve and may be easily replaced.

Another feature of this invention includes the provision of an enlargement on the stem defining an annular tapered shoulder which forms a tight metal-to-metal seal with an inwardly facing complementary tapered shoulder on the bonnet. The tapered shoulder of the bonnet is defined by an inwardly extending cantilevered annular flange or arm which is free to flex slightly for insuring the tight metal-to metal seal with the stem. The free arm of the bonnet is positioned beneath the inner end of the packing sleeve to form an inner stop or support for the packing assembly. The packing assembly is compressed between an abutment on the packing sleeve and the free flange of the bonnet.

DESCRIPTION OF THE DRAWINGS

FIG. 1 is an elevational view with certain parts shown in section of a combined actuator and gate valve structure employing the packing sleeve carrying the packing assembly thereon and positioned around a gate valve stem;

FIG. 2 is an enlarged section view showing the packing assembly carried by the packing sleeve and being partially removed from the bonnet;

FIG. 3 is a section view taken generally along the line 3—3 of FIG. 1;

FIG. 4 is an enlarged section of the annular shoulder on the valve stem for engaging a complementary facing shoulder on the bonnet with the stem being illustrated in initial contact with the bonnet.

FIG. 5 is a section similar to FIG. 4 showing the shoulder on the valve stem in full metal-to-metal surface contact with the complementary bonnet shoulder, the annular free portion of the bonnet forming the shoulder being flexed slightly to provide the tight metal-to-metal contact;

FIG. 6 is an enlarged section view of the joint between the bonnet and the actuator cylinder illustrating a quick disconnect feature; and FIG. 7 is a sectional view with certain parts shown in an exploded position illustrating the disassembly of the actuator to provide easily access to the packing sleeve for removal of the packing assembly.

Referring now to the drawings for a better understanding of this invention, and more particularly to FIG. 1, a gate valve structure is generally indicated at 10, including a gate valve body 12 having an upper flange 14 thereon. A gate valve 16 is adapted for movement between open and closed positions relative to flow passage 18 and has a stem generally indicated at 20 connected thereto. Stem 20 includes a small diameter lower portion 22 connected to gate valve 16, an intermediate enlarged diameter portion 24, and an upper small diameter portion 26.

A bonnet generally indicated at 28 has a generally cylindrical main bonnet body 30 with a lower flange 32 thereon. Lower flange 32 is secured by suitable nut and bolt combinations 34 to upper flange 14 of valve body 12. Bonnet 28 has an upper flange 36 and a pneumatic actuator generally indicated at 38 is mounted on upper bonnet flange 36. Pneumatic actuator 38 includes a cylindrical housing 40 forming a piston chamber for piston 42 which is secured to upper end 26 of stem 20. A spring 44 is biased between the underside of piston 42 and a seat 46 formed by bonnet 28 adjacent lower flange 32. Piston 42 is shown in FIG. 1 in its up position in the closed position of gate valve 16. Air from a suitable pressure source is supplied through opening 48 to the piston chamber to move piston 42 downwardly. An end plate 50 closes the piston chamber and has an opening 52 therein receiving stem end 26.

The lower joint connecting cylindrical housing 40 to bonnet upper flange 36 is shown particularly in FIGS. 3, 6, and 7, and includes a connecting ring 54 formed of two semi-circular portions 54A and 54B with a plurality of bolt openings 56 spaced about a circle. Flange 36 has a plurality of threaded bolt openings 58 therein arranged in a circle for alignment with openings 56. Connecting ring 54 has an inner holding flange 60 adapted to fit within an outer annular groove 62 in housing 40. Upper bonnet flange 36 has an annular groove 64 therein which receives the lower end of cylindrical housing 40. Externally threaded studs 66 are threaded within internally threaded openings 58. Then, ring portions 54A and 54B are positioned with holding flange 60 fitting within groove 62. Nuts 68 are then threaded on studs 66 to hold cylindrical housing 40 in tight engagement with bonnet upper flange 36.

The upper joint connecting cylindrical housing 40 to end plate 50 is provided with a similar upper ring 70 arranged in two semi-circular portions and fitting with an outer annular groove 72 in cylindrical housing 40. Connecting ring 70 has an annular extension 74 which is adapted to fit in an annular groove 76 in end plate 50 as shown in FIG. 1. Suitable openings 77 are formed in end plate 50 alignable with corresponding openings in ring 70, and ring 70 receives externally threaded studs 78 having ends secured by nuts 80.

Bonnet 28 has an annular cup-shaped projection 82 defining seat 46 for spring 44 and is internally threaded at 81 as shown in FIG. 2 particularly. Spring 44 fits around projection 82 which extends axially of stem 20. Projection 82 has an upper end 83 and an annular flange or arm 84 extends inwardly from the inner circumference 86 of the projection 82. Annular flange 84 has a projecting finger or lip 88 and defines an inwardly facing annular shoulder 90. Shoulder 90 extends between and connects inner peripheral surfaces 92 and 94 of bonnet 28 with face stem 20. As shown particularly in FIGS. 4 and 5, enlarged intermediate diameter portion 24 of stem 20 has an annular flange or embossment 96 thereon which defines a tapered shoulder 98 facing and generally complementary to shoulder 90 formed by inner annular flange 84. As shown in FIG. 4, when gate valve 16 is moved to the closed position, shoulder 98 initially contacts shoulder 90 at the upper end portion thereof. Upon increased bias from spring 44, arm or flange 84 which is flexible under the force of spring 44, flexes inwardly and shoulders 90 and 98 move into a tight metal-to-metal surface contact as shown in FIG. 5 to provide a tight seal. The thickness of arm 84 may be around ⅜ inch in thickness, for example, to provide the flexibility for insuring a metal-to-metal contact along substantially the entire opposed surfaces of shoulders 90 and 98.

A packing sleeve is indicated generally at 100 and has an outer or upper end extending above bonnet upper flange 32 and having flat portions 102 as shown particularly in FIG. 3. Thus, upon removal of cylindrical housing 40, a suitable removal tool, such as a wrench, may be fitted about flat portions 102 for removal of sleeve 100, and for tightening sleeve 100 if desired. A lower end portion 103 of sleeve 100 is threaded at 104 about its outer circumference and engages internal threads 81 on cup-shaped projection 82 as shown in FIG. 2. An annular shoulder 105 is formed on sleeve 100 adjacent threads 104. An outer O-ring 106 provides a seal between lower end portion 103 of sleeve 100 and the adjacent inner surface 86 of cup-shaped projection 82. A pocket is formed adjacent the lower inner circumference of lower end portion 103 for receiving the packing assembly which is identified generally by numeral 108. The pocket is defined by an upper annular shoulder 110 and an inner peripheral surface 114. Packing assembly 108 includes a packing bushing 116 abutting shoulder 110 and having respective inner and outer O-rings 118 and 120 in engagement with intermediate stem portion 54 and surface 114 respectively. The packing material is indicated at 122 and includes a plurality of packing rings. A back-up ring 124 is provided adjacent the lower end of packing material 122. A snap ring 126 fits in a groove 128 of lower end portion 103 to hold packing assembly 108 therein. Packing assembly 108 is thus carried by stem 100 and the pocket defined therein between snap ring 126 and annular shoulder 110. Thus, upon removal of packing sleeve 100, packing assembly 108 is removed thereby. Back-up ring 124 engages the upper surface of finger 88 and packing 124 is compressed between shoulder 112 and back-up ring 124 in engagement with finger 88. An annular groove 130 on the underside of piston 42 receives the upper end portion of packing sleeve 100 in the event piston 42 is moved closely adjacent bonnet flange 36 which forms the bottom of the piston chamber.

From the foregoing, it is apparent that the packing assembly may be easily inserted and replaced if necessary. Cylindrical housing 40 may be easily removed by removal of connecting ring 54 thereby to expose the upper end of sleeve 100. A suitable tool may be employed to engage flat portions 102 at the upper end of sleeve 100 to unthread sleeve 100 as shown in FIG. 2 with packing assembly 108 being carried by sleeve 100. After the packing assembly is replaced, sleeve 100 may again be inserted within the bonnet.

In addition, a tight metal-to-metal seal is obtained between stem 20 and bonnet 28 in the full closed position of the gate valve by an inner flexible shoulder 90 on bonnet 28 in surface contact with a complementary shoulder 98 on stem 20.

What is claimed is:

1. In combination with a gate valve and fluid actuator therefor having a gate valve body, a gate valve mounted in said body for reciprocal movement between open and closed positions, a stem connected to the gate valve and extending therefrom, a bonnet having a lower flange secured to the valve body, a cylindrical actuator body mounted on the upper end of the bonnet and receiving the stem, and a piston mounted within the cylindrical actuator body for reciprocal movement and operatively connected to the stem for moving the gate valve between open and closed positions; the improvement comprising:

a packing sleeve receiving the stem and having an externally threaded inner end threaded within the bonnet adjacent the lower portion thereof, said packing sleeve carrying a packing assembly positioned between the stem and the sleeve, and means to connect said packing assembly to said packing sleeve for longitudinal movement with said sleeve, said packing sleeve extending upwardly from said packing assembly to the cylindrical actuator body and having an outer end portion adapted for fitting with a removal tool, said packing assembly upon unthreading of said sleeve for removal from said bonnet being carried by and removed with said sleeve from said bonnet, said packing assembly including upper and lower annular members with packing material arranged between said annular members.

2. The combination as set forth in claim 1 wherein said bonnet has a body with an upper flange thereon, said actuator body being supported on the upper flange of said bonnet, said packing sleeve extending outwardly with its upper end portion at a position above said upper flange.

3. The combination as set forth in claim 2 wherein a connection joint is formed between the upper flange and the actuator body, said connection joint comprising an outer annular ring segmented into at least two arcuate segments, said cylindrical actuator body having an annular groove about its outer circumference adjacent said upper flange receiving at least a portion of said ring, and means securing the ring to said upper flange for holding said body on said upper flange.

4. The combination as set forth in claim 1 wherein said stem has an embossment thereon defining a beveled stem shoulder, and said bonnet has an inwardly extending flexible annular flange thereon defining a bonnet shoulder generally complementary to said stem shoulder and contacting said stem shoulder at the closed position of the gate valve, said annular flange flexing upon a thrust force being exerted by the stem shoulder at the closed position into a substantially full face-to-face contact with said stem shoulder.

5. In combination with a gate valve and fluid actuator therefor having a gate valve body, a gate valve mounted in said body for reciprocal movement, a stem connected to the gate valve and extending therefrom, a bonnet on the gate valve body including a main bonnet body having upper and lower flanges thereon, a cylindrical actuator housing mounted on the upper bonnet flange and receiving the stem, a piston mounted within the housing and operatively connected to the stem for moving the gate valve between open and closed positions, a removable connecting ring removably connecting the cylindrical housing to the upper bonnet flange, a packing sleeve about the valve stem and removably secured to the lower portion of the bonnet, said packing sleeve having an upper end portion extending beyond the upper flange of the bonnet, said upper end portion being exposed and adapted to fit a removal tool after the connecting ring and the cylindrical housing have been removed from the upper flange of the bonnet, and a packing assembly between the stem and the packing sleeve.

6. The combination as set forth in claim 5 wherein said bonnet has a generally cylindrical projection extending upwardly from the lower flange of the bonnet about the stem, an annular flexible flange extending inwardly from the projection and defining a beveled inwardly facing bonnet shoulder, said stem having an enlarged diameter portion thereon defining a beveled outwardly facing stem shoulder generally complementary to said bonnet shoulder, said stem shoulder initially contacting said bonnet shoulder in a generally line contact relation upon initial movement of the gate valve to a closed position, said flexible flange flexing upon a thrust force exerted by the stem shoulder at the closed position into a substantially full face-to-face contact with said stem shoulder.

7. The combination as set forth in claim 6 wherein said flexible flange has an upwardly extending lip thereon, and said packing assembly includes a packing material engaging the stem and removably mounted on the packing sleeve for movement with the packing sleeve.

8. The combination as set forth in claim 7 wherein said packing sleeve has a pocket to receive the packing assembly defining an upper annular shoulder, said packing assembly including a bushing ring abutting said upper annular shoulder, said packing material being positioned adjacent the bushing, and a snap ring adjacent the lower side of the packing material engaging the packing sleeve for removably retaining the packing assembly in position on the packing sleeve.

* * * * *